(12) United States Patent
Lowry et al.

(10) Patent No.: US 11,297,961 B2
(45) Date of Patent: Apr. 12, 2022

(54) CUSTOMIZABLE SUPPORT AND COMFORT PILLOW

(71) Applicants: Deborah Lowry, Tampa, FL (US); Simone Aline Sanfilipo, Tampa, FL (US)

(72) Inventors: Deborah Lowry, Tampa, FL (US); Simone Aline Sanfilipo, Tampa, FL (US)

( * ) Notice: Subject to any disclaimer, the term of this patent is extended or adjusted under 35 U.S.C. 154(b) by 0 days.

(21) Appl. No.: 16/566,558

(22) Filed: Sep. 10, 2019

(65) Prior Publication Data

US 2020/0077820 A1    Mar. 12, 2020

Related U.S. Application Data

(60) Provisional application No. 62/729,566, filed on Sep. 11, 2018, provisional application No. 62/729,158, filed on Sep. 10, 2018.

(51) Int. Cl.
| | | |
|---|---|---|
| *A47G 9/10* | (2006.01) | |
| *A47C 7/38* | (2006.01) | |
| *A45F 3/14* | (2006.01) | |
| *A45F 3/00* | (2006.01) | |

(52) U.S. Cl.
CPC .............. *A47G 9/1045* (2013.01); *A45F 3/14* (2013.01); *A47C 7/383* (2013.01); *A47G 9/1027* (2013.01); *A45F 2003/003* (2013.01); *A45F 2003/142* (2013.01)

(58) Field of Classification Search
CPC .. A47G 9/1027; A47G 9/1081; A47G 9/0253; A47C 27/081; A47C 21/026; A47C 7/383; A47C 7/36; A47C 21/00; A45F 2003/003; A45F 3/005
See application file for complete search history.

(56) References Cited

U.S. PATENT DOCUMENTS

| | | | | |
|---|---|---|---|---|
| 5,987,667 | A * | 11/1999 | Haverly | A47G 9/1045 5/417 |
| 6,748,615 | B1 * | 6/2004 | Tiedemann | B60N 2/882 5/640 |
| 2009/0235459 | A1 * | 9/2009 | Tidwell | A47G 9/10 5/640 |
| 2017/0027346 | A1 * | 2/2017 | Konigsberg | A47C 7/383 |
| 2018/0263389 | A1 * | 9/2018 | Lee | A47G 9/0223 |

OTHER PUBLICATIONS

"Pillow Meaning." Pillow Meaning | Best 21 Definitions of Pillow, www.yourdictionary.com/pillow.*

* cited by examiner

*Primary Examiner* — David R Hare
*Assistant Examiner* — Madison Emanski
(74) *Attorney, Agent, or Firm* — Walter Haverfield LLP; James J. Pingor

(57) ABSTRACT

A customizable support pillow offering support and comfort for the neck and body of a user that includes a built in anchoring system for attaching the customizable pillow to a structure such as a vehicle seat.

13 Claims, 10 Drawing Sheets

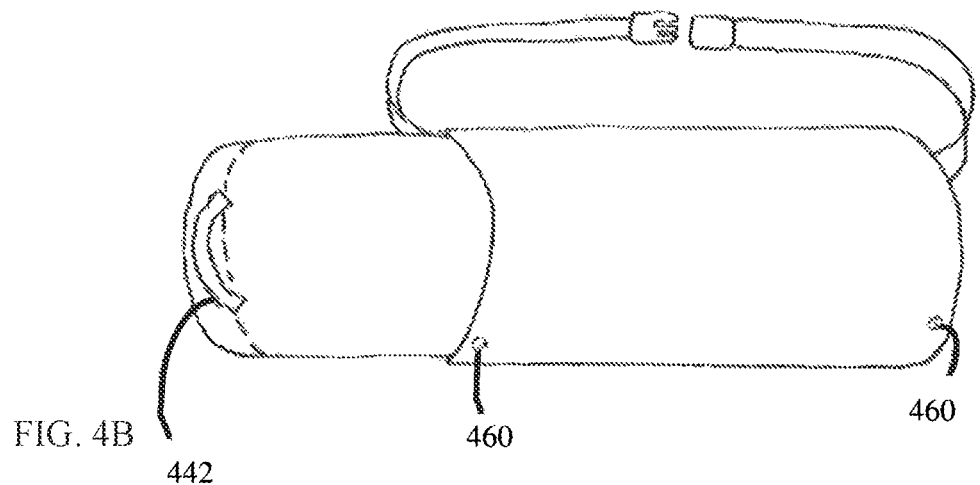
FIG. 4B
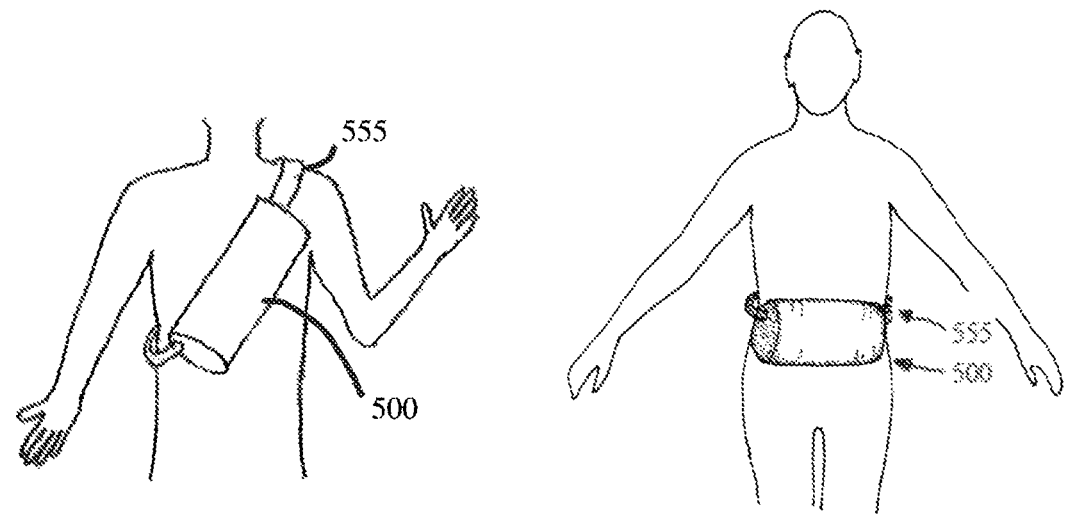
FIG. 5A
FIG. 5B

CUSTOMIZABLE SUPPORT AND COMFORT PILLOW

CROSS-REFERENCE TO RELATED APPLICATIONS

This application claims the benefit of U.S. Provisional Application Ser. No. 62/729,158 entitled "CUSTOMIZABLE SUPPORT PILLOW" filed on Sep. 10, 2018 and U.S. Provisional Application Ser. No. 62/729,566 entitled "CUSTOMIZABLE SUPPORT PILLOW" filed on Sep. 11, 2018 each of which is incorporated herein in its entirety by reference.

TECHNICAL FIELD

The innovation relates to a customizable support pillow offering support for the neck and body (e.g., lumbar support) of a user that includes a built in anchoring system for attaching to a seat or other desired structure.

BACKGROUND

Pillows are often used by travelers to provide comfort during trips (e.g, long car rides, airplane trips, train trips, etc.). These travel pillows offer neck support, but do not provide adequate body support. In addition, present travel pillows are difficult to position and often slip and fall out of place due to movement of the user and/or vehicle movement. Thus, there remains a need for a versatile pillow useful for travel that provides neck and body support.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

According to an aspect, the innovation provides a shapeable pillow that includes an attached anchoring system/storage container. In one embodiment, the shapeable pillow may be a tubular shaped pillow made from a shapeable material. The shapeable pillow may include an attached bag in which the shapeable pillow may be stored. The attached bag may include an attachment means (e.g., a drawstring, a strap, a snap, a hook, hook and loop attachments, a zipper, a belt, etc.) for securing the bag while the pillow is in use.

In one embodiment, the anchoring system/storage container forms a part of the tubular shaped pillow. For example, the anchoring system may comprise a bag, hood, etc. that is an integral part of the pillow. In another embodiment, the anchoring system may be a separate or separable component that is distinct from the pillow. For example, the anchoring system may be a bag, hood, belt, etc. that is not an integral part of the pillow. The anchoring system may be used to secure the pillow to a headrest on a seat (e.g., a vehicle seat), a shoulder strap for a seat belt, or any other structure to facilitate placement of the pillow for use by the consumer. The anchoring system may also be used to transport the pillow. For example, the anchoring system (e.g., a belt or a strap) may be used to transport the pillow by the consumer (e.g., by wearing it over the shoulder, cross-body, or around the waist) or attached to luggage or a back pack.

According to an aspect, the tubular shaped pillow may comprise an outer pillow and an inner pillow. The inner pillow may be configured to fit substantially inside a cavity within the outer pillow. The outer pillow may include an inflatable portion. The inner pillow may be attached or attachable to the outer pillow and/or the anchoring system. In one embodiment, the inner pillow may be removably attached to the outer pillow. In another embodiment, the inner pillow may be fixedly attached to the outer pillow.

BRIEF DESCRIPTION OF THE DRAWINGS

FIGS. 4A and 4B are diagrams depicting a pillow according to an embodiment of the innovation.

FIGS. 5A and 5B are diagrams depicting embodiments according to the innovation.

DETAILED DESCRIPTION

Figure 1:
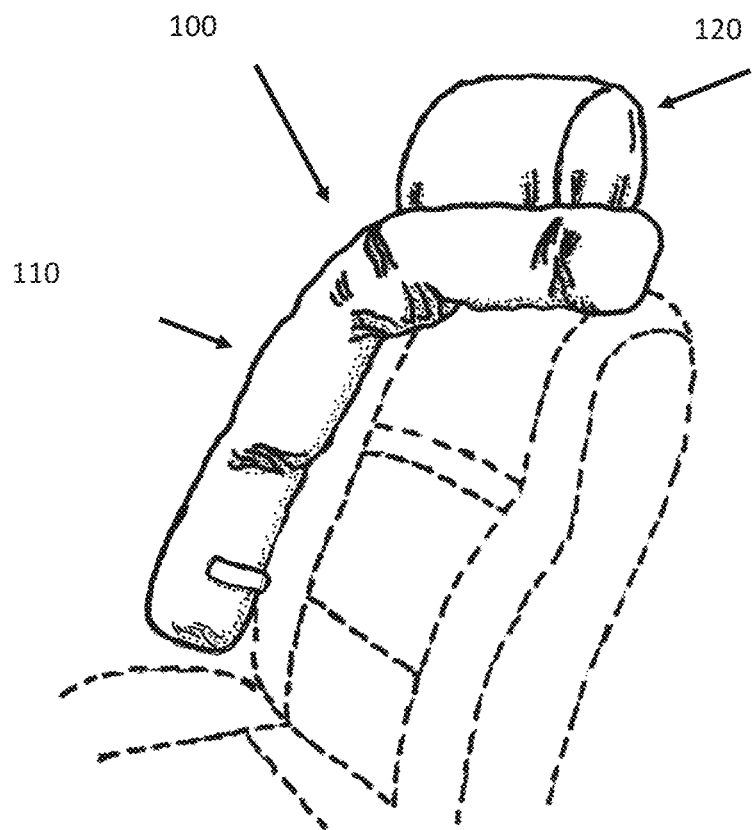
FIG. 1 is a photograph of an embodiment according to the innovation.

In the following description, for purposes of explanation, numerous specific details are set forth in order to provide a thorough understanding of the subject innovation. It may be evident, however, that the innovation can be practiced without these specific details.

According to an aspect, the innovation provides a pillow (or support device) that includes an attached or an attachable anchoring system/storage container. In one embodiment, the pillow may be a tubular shaped pillow. In one embodiment, the pillow may be made from a shapeable material. The shapeable pillow may include an attached bag in which the shapeable pillow may be stored. The attached bag may include an attachment means (e.g., drawstrings, straps, etc.) for securing the bag while the pillow is in use. A suitable attachment means is most any attachment means known for securing materials. For example, the attachment means may include a drawstring, a handle, a belt, a strap, a snap, a hook, a sleeve, a bag, a hood, a hook and loop fastener, or any other fastener.

In one embodiment, the pillow (and/or its attached bag) may include a storage compartment for storing personal items (e.g., ID cards, passport, earbuds, etc.). The storage compartment may be a pocket, including a zippered pocket. In one example, the outer pillow may include a compartment (e.g., a zippered compartment). In one example, the inner pillow may include a compartment.

For example, the bag may be attached to the headrest of a seat in a car. In one embodiment, the bag may include a drawstring closure that may be used to close the bag when the pillow is not in use and/or may be used to secure the bag to the head rest when the pillow is in use. For purposes of this description, a pillow not in use is a pillow that has been placed inside the attached bag. A pillow in use is one that is not inside the bag. It is to be understood that this description in no way limits the function of the pillow. For example, a pillow stored inside the bag may still be used as a pillow. In addition, a pillow outside the bag may be placed on a seat in anticipation of use.

The pillow may be made from most any suitable material. In one embodiment, the pillow may comprise a fill material and a cover material. Suitable fill materials include fiber fill, cotton, foam, feathers, synthetics or any other suitable material that may be shaped for comfort and storage. In one embodiment, the pillow may comprise a cover material that at least partially covers the fill material. The cover material may comprise any suitable (and comfortable) material, for example, capable of stretching/folding to facilitate use of the pillow. In one embodiment, the cover material may contain spandex.

In one embodiment, the pillow may comprise an inflatable material. In an embodiment, the storage container may also function as a pillow. In one embodiment, the pillow may comprise a storage container (an outer pillow) and an inner pillow. The outer pillow may be configured to house an inner pillow. The outer pillow may comprise inflatable material (e.g., an inflatable bladder). The inflatable material may be inflated by the consumer to a desired inflation level that enables the consumer to use both the inner pillow and the outer pillow to increase support and/or comfort. In one embodiment, the outer pillow may include at least three distinct layers. The outer pillow may comprise an outer layer comprising a soft plush material designed for comfort of the consumer. In one embodiment, the outer layer may be removable and washable. The outer pillow may further comprise a middle layer comprising an inflatable material and an inside layer comprising a relatively smooth surface to accommodate the inner pillow and facilitate positioning of the inner pillow within the cavity of the outer pillow.

In one embodiment, the outer pillow (e.g., the storage container or shell) may include an anchoring system/attachment means for securing the pillow for use. The attachment means may include most any attachment capable of securing or connecting the pillow to a structure. Suitable attachments may include a drawstring, a handle, a strap, a snap, a clip, a hook, hook and loop attachments, a zipper, a belt, etc. In one embodiment, the attachment means may include a belt or a strap. The belt or strap may be adjustable and may be used to secure the pillow to, for example, the headrest of a vehicle seat. When not secured for use, the belt may be used to carry the pillow. For example, the belt or strap could be used by the consumer to carry the pillow (e.g., over the shoulder, across the chest, around the waist) or it could be used to secure the pillow to a backpack or luggage.

The anchoring system/attachment means may further include attachment portions such as holes, slits, opening, tabs, for accommodating attachment means to attach an inner pillow. For example, the anchoring system may comprise a belt or a strap having grommets therein. As described below, the inner pillow may include various attachment portions for items such as clips. These clips may be used to secure the inner pillow to the anchoring system/attachments means. This configuration may be useful for various uses including uses in which the inner pillow is separated from the outer pillow.

In an embodiment, the inner pillow is configured to fit within a cavity within the outer pillow and to be slidably positionable within the cavity. The inner pillow may fit entirely or substantially entirely within the cavity of the outer pillow. In one embodiment, the inner pillow fits at least partially within the cavity of the outer pillow. The inner pillow may include a handle or a loop to facilitate positioning (e.g., extending the inner pillow to a desired length or removing the inner pillow from the outer pillow). The inner pillow may be fixedly attached to the outer pillow such that the inner pillow may be substantially removed or entirely removed from the outer pillow.

The inner pillow may alternatively be removably attached and reattachable to the outer pillow. In this configuration, the inner pillow may be used separately from the outer pillow. For example, the outer pillow could be used for neck support and the inner pillow could be used for lumbar support. It will be appreciated that the removably attached inner pillow may be still be used as a pillow when it is attached to the outer pillow.

In one embodiment, the outer pillow may comprise a closable compartment for storing the inner pillow. For example, zippered compartments on either end of the outer pillow may be configured to open to accommodate the positioning, removal, or insertion of the inner pillow.

In one embodiment, the outer pillow may include at least one inflatable portion. The inflatable portion allows a consumer to inflate the outer pillow to a desired firmness. In this embodiment, the inflatable portion may be operatively connected to an inflation means. The inflation means may be automatic or manual. Suitable inflation means include, but are not limited to, an inflation port, a valve, or any other means by which air may be transported into the inflatable material to achieve inflation. In one embodiment, the inflation means may include a handheld air pump.

In one embodiment, each of the outer pillow and inner pillow may include attachment means.

In one embodiment, the pillow may be quilted to facilitate folding/shaping of the pillow for purposes of comfort and/or storage. For example, in one embodiment, the quilting may facilitate shaping the pillow to position it comfortably for the user and/or folding the pillow so that it fits inside the attached bag.

In one embodiment, the pillow may be stored in most any type of storage device/container, including, but not limited to, a bag, a pouch, a pocket, a sleeve, etc. In one embodiment, the pillow may be stored in a bag. The bag may be made from most any suitable material. In one embodiment, the material is a stretchable material. In one embodiment, the bag and the pillow may be made from the same material. In one embodiment, the bag may comprise a cover made from spandex or any other suitable stretchy material. The bag may be designed to fit over just about any seat/chair (e.g., a headrest on a seat in a car, the top of a recliner, etc.).

The bag may be secured to the seat by most any known attachment means. Suitable attachment means may include a drawstring, hook and loop fasteners, ties, snaps, buttons, zippers, magnets, elastic pull-strings, etc. The attachment means may also be used to transport the pillow by being worn by the consumer (e.g., by straps) or to secure the pillow to a backpack or luggage.

In one embodiment, the bag may be a drawstring bag, with the drawstrings configured to close the bag when not in use and to tightened around the seat (e.g., the headrest) to securely attach the bag (and, thus, the pillow) to the seat. The bag is placed over the headrest of a car and secured to the headrest using the drawstring.

While a bag is described as the attachment means, it is to be understood that most any attachment means may be employed without departing from the spirit and/or scope of the innovation and claims appended hereto. It is also to be understood that the attachment means may be fixedly attached or removably attached. By way of example and not limitation, hook and loop fasteners, drawstrings, clips, loops, snaps, belts, or fastenable straps can be employed to attach the pillow to a stationary structure (e.g., seat); and secure a rolled, bunched or folded pillow when not in use. In one embodiment, the bag, the pillow, or both the bag and the pillow may include an additional attachment portion for securing the bag and/or the pillow in a desired configuration. For example, the bag and/or pillow may include an attachment portion (e.g., a strap) that allows a user to secure a portion of the bag and/or pillow to a structure (e.g., the headrest supports or a grip) to provide greater control over the shape of the pillow. In one example, the pillow may include an adjustable strap that can be moved along the length of the pillow and be used to secure the pillow to a structure or to secure the pillow in a particular configuration.

In one embodiment, both the outer pillow and the inner pillow may include additional attachment portions for securing each of the outer pillow and the inner pillow in a desired configuration. These attachment portions may include handles, straps, loops, snaps, clips, etc. For example, the outer pillow and the inner pillow may include attachment portions such that the inner pillow and the outer pillow can be attached to each other in a desired configuration. In another example, the inner pillow may include attachment means (e.g., clips) for securing the inner pillow to a structure (e.g., a seat frame or window).

In one embodiment, the bag and/or pillow may include attachment members for attaching a blanket. For example, the pillow may include buttons, snaps, or hook and loop attachments for attaching a blanket having corresponding mating attachment member.

Figure 14:
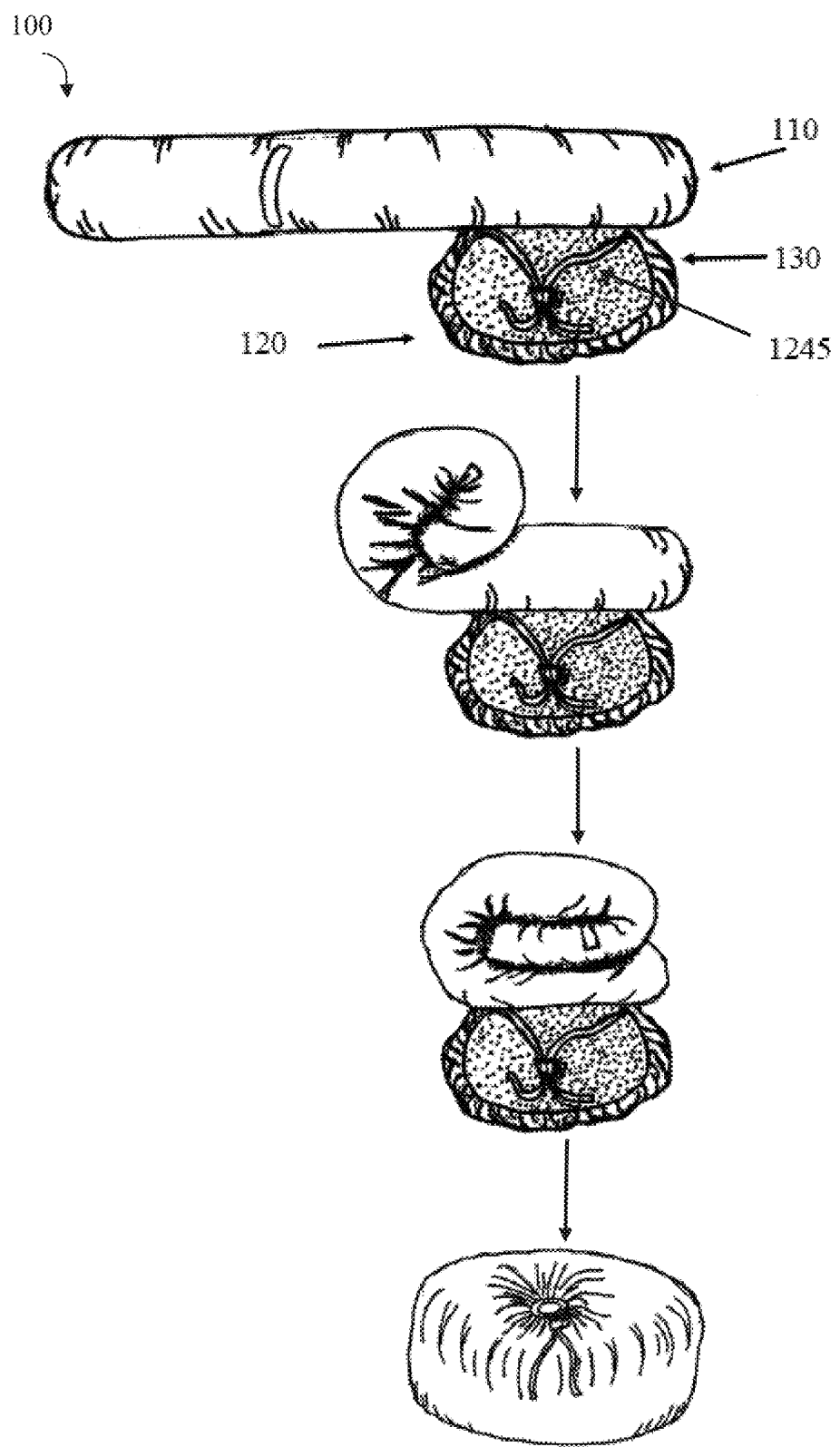
FIG. 14 depicts a flow chart showing a folding of a pillow with attached bag according to an embodiment of the innovation.
Figure 15:
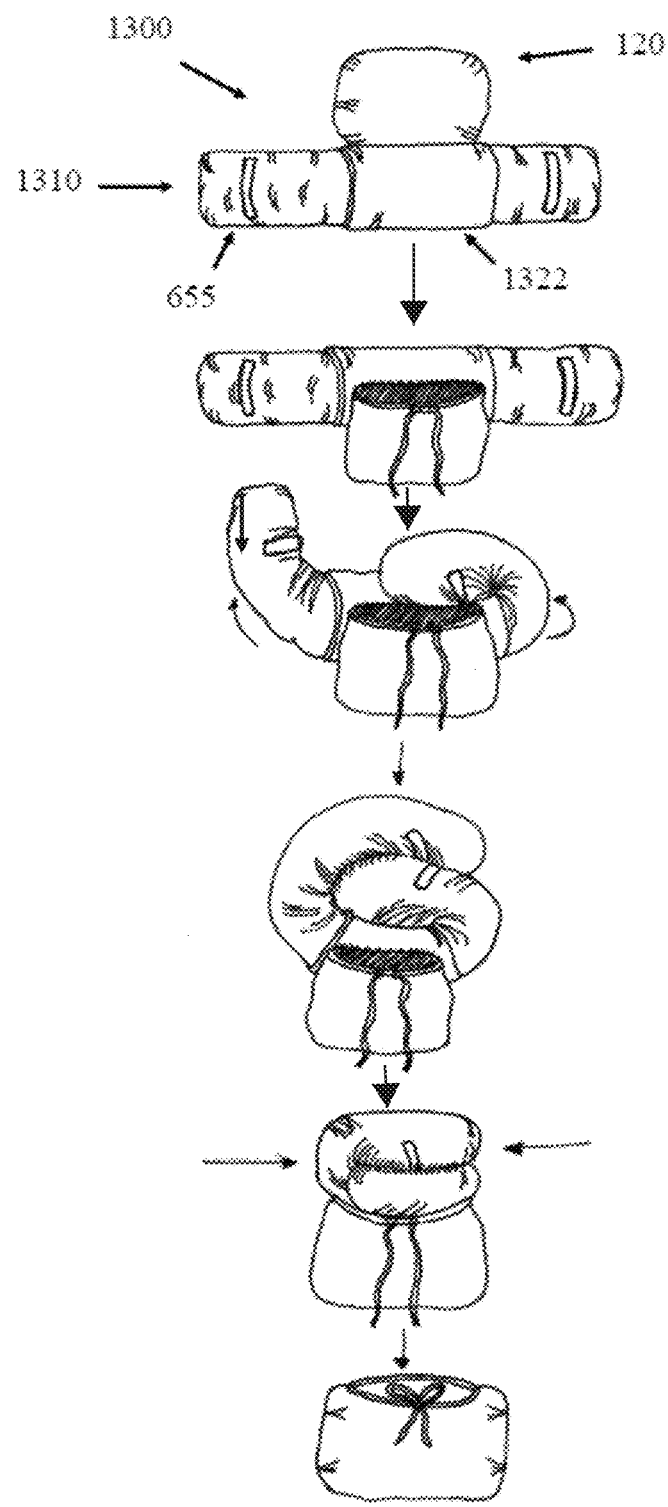
FIG. 15 depicts a flow chart showing folding of a pillow with an adjustable sleeve and attached bag according to an embodiment of the innovation.

In one embodiment, the pillow (e.g., the outer pillow, the inner pillow, or both) may comprise a body that is generally tube-shaped and is attached to a drawstring bag (e.g., FIGS. 14 and 15). In one embodiment, the pillow may be detachably connected to the bag. In another embodiment the pillow may be integrally attached to the bag. In an embodiment, the bag may be placed over the headrest of a seat or chair. The pillow, now removed from the bag, may be configured to provide comfort to the user. For example, a portion of the pillow may be positioned behind the neck of the user, with the remaining portion allowed to hang down to the side. The pillow may be positioned to provide support along the side of a user. The pillow may also be configured to provide additional neck, back, lumbar, or shoulder support. In one embodiment, the pillow may be configured to provide a round pillow/cushion (e.g., FIG. 14).

In one embodiment, the pillow may comprise one or more pull-strings to provide versatility in shaping. For example, the pillow may include a pull-string channel on one side of the pillow. Pulling the string may change the overall shape of the pillow from a tube shape to a generally circular tube shape. In one embodiment, the pull-string may comprise an elastic or otherwise stretchable material to facilitate shaping or re-shaping of the pillow for comfort. In one embodiment, the pillow may include an adjustable strap that may be used to facilitate shaping or re-shaping the pillow.

In embodiment, the flexible pillow tube may be stored inside a shell (e.g., outer pillow or a neoprene tube). In one embodiment, the shell may include an attachment means for securing the pillow (e.g., the outer pillow with the inner pillow stored inside it) to a structure. The shell, with the flexible pillow tube stored inside, may, itself, be stored inside the bag as described above. When outside of the bag, the shell, with the flexible pillow tube stored inside may be used as a pillow itself. The flexible pillow tube may be pulled from shell and used as described herein as a customizable support pillow.

In one embodiment, the bag is made of a spandex cover allowing for stretching to any size headrest or chair. In another embodiment, the bag is not stretchable but rather universally sized to address an intended application. The pillow may also have a spandex cover allowing for comfort and stretching to use and fold up inside the bag when needed as a small pillow or to attach to a carryon bag with a tie/strap. The pillow in the spandex cover is filled with fiber fill and quilted. The quilting allows the pillow to fold up and insert inside the bag for storage or use as a pillow.

In one embodiment, the bag is a reversible bag. With a reversible bag, the pillow can be positioned on either side of the user. The bag may be placed over the headrest or chair. In one embodiment, the pillow may run along the neck of the user and be configured to fall to a side of the user to provide comfort/support. In one embodiment, the portion of the pillow that is attached to the bag provides neck support. The remaining portion may be positioned according to the desires of the user or may fall to the side. This portion may be used to cushion the body against the door of the car, scrunched up to provide additional neck support, or for lumbar support, or configured in most any way to provide comfort to the user.

One advantage to the configuration of the innovation is that when, for example, a car door is opened during a fuel, food, or rest break, the pillow will simply hang from the headrest (via the attached bag) and will not fall out of the car. When not in use, it can be flung backwards over the seat while still hanging on the headrest. Or it can be folded up to the size of small pillow. This small pillow can also be attached to luggage, allowing it to easily be carried on an airplane or train.

In one embodiment, the size of the bag/container can vary to fit over varying size headrests or seatbacks. In one embodiment, the attachment means may be adjustable to accommodate various uses. For example, a belt or strap may be adjustable to fit a variety of seats/headrests and may further be adjusted for carrying purposes (e.g., to be carried cross-body or around a consumer's waist.)

Figure 2:
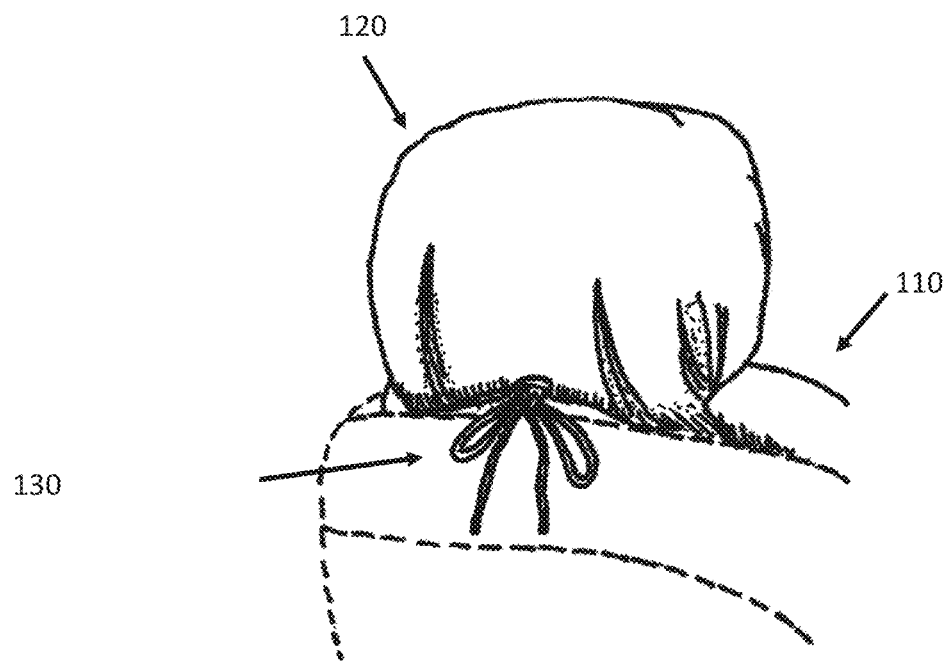
FIG. 2 is a photograph of an embodiment according to the innovation.
Figure 3:
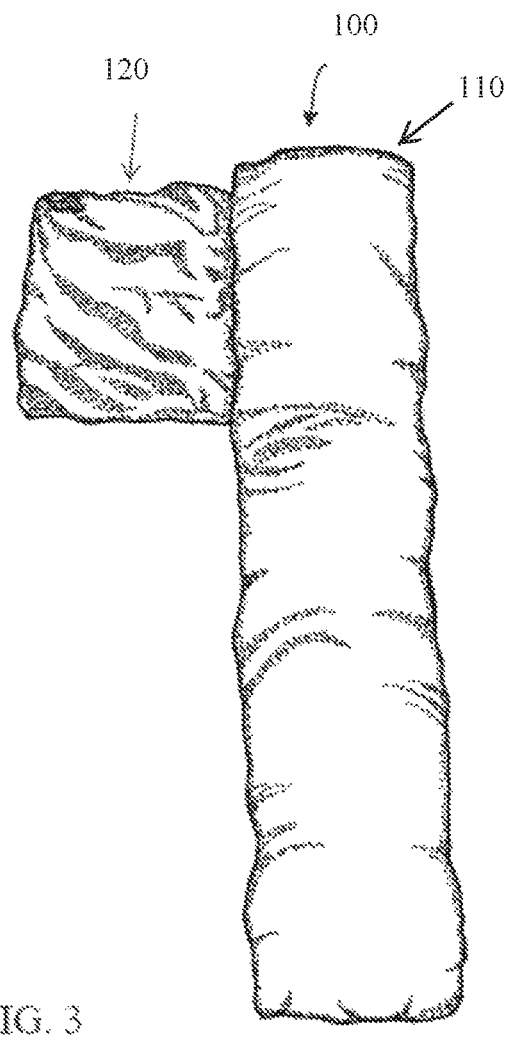
FIG. 3 is a photograph of an embodiment according to the innovation.

Turning now to FIGS. 1-3, an embodiment of the innovation is depicted in which the pillow 100 includes an attached bag 120 and a pillow body 110. The bag 120 may fit over a vehicle headrest and be secured to the headrest using a drawstring 130. When not in use (e.g., when not attached to the headrest), the pillow body 110 may be stored inside the bag 120. In this configuration, the pillow 100 may be used as a cushion.

Figure 4A:
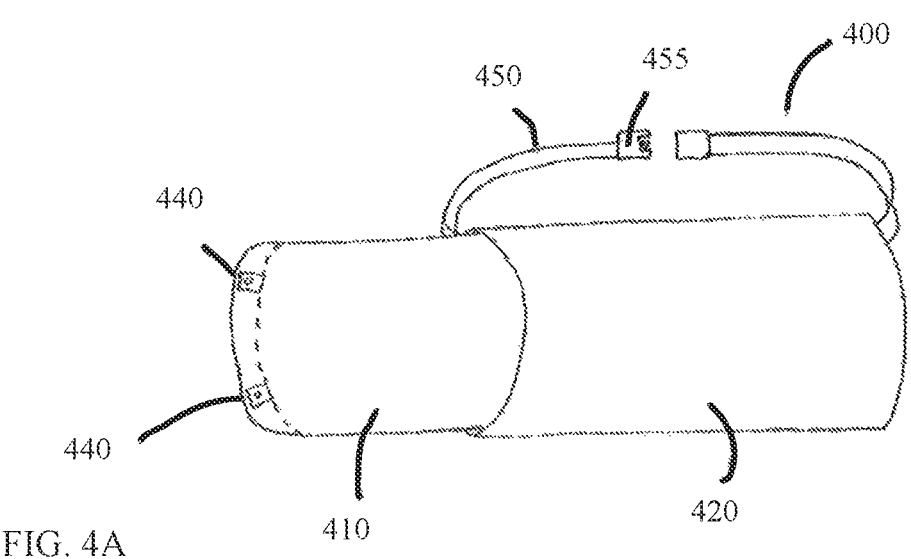

FIGS. 4A and 4B are diagrams depicting embodiments of the pillow 400 that include an outer pillow 420 configured to hold an inner pillow 410 within a cavity 870. The outer pillow 420 and inner pillow 410 are configured such that the inner pillow 410 may be slideably positioned within the cavity of the outer pillow 420. The inner pillow may be removed entirely from within the outer pillow. In some embodiments, the inner pillow 410 remains attached or attachable to the outer pillow 420 even when fully removed from within the outer pillow. In other embodiments, the inner pillow 410 may be deattached or deattachable from the outer pillow 420. The inner pillow 410 is further configured such that it can be placed back into the cavity within the outer pillow 420 for storage or other use. In the depicted embodiment, the outer pillow may include openings 460 configured to accept attachment means such as clips, straps, etc. The inner pillow 420 may also include features such as tabs 440 or handles/loops 442 designed to accept an attachment means. As will be appreciated, the outer pillow 420 and inner pillow 410 may have any suitable means for accommodating attachment means. It will also be appreciated that either the outer pillow 420, the inner pillow 410, or both may include any number of attachment means.

As depicted in FIGS. 4A and 4B, a belt 450 may be attached to the outer pillow. The belt 450 may include a clasp 455. In some embodiments, the belt may be an adjustable belt.

As shown in FIGS. 5A and 5B, the belt 555 may be used to transport the pillow 500. For example, a consumer may wear the pillow 500 in a cross-body position (FIG. 5A) or around her waist (FIG. 5B) or around the neck.

Figure 6:
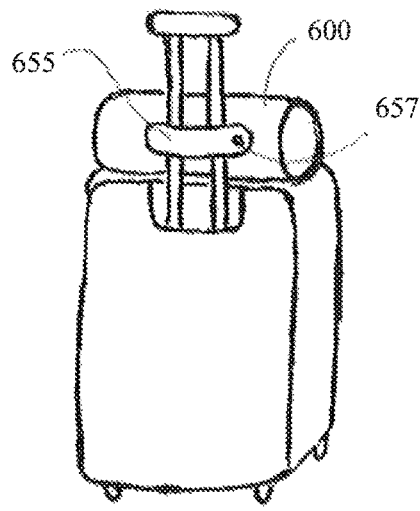
FIG. 6 is a diagram depicting an embodiment according to the innovation.
Figure 7:
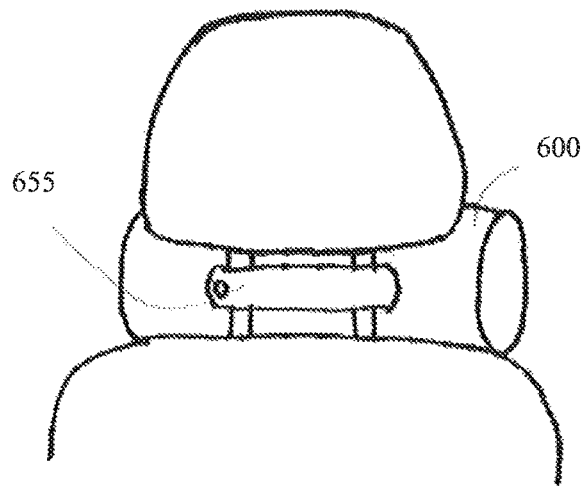
FIG. 7 is a diagram depicting an embodiment according to the innovation.

In another embodiment, the pillow 600 may include a strap 655 that may be used to secure the pillow 600 to, for example luggage (FIG. 6) or to a headrest of a seat (FIG. 7). The strap may be made from a sturdy flexible material such as a flexible plastic or rubber. The strap may have a securing means 657 such as a snap or toggle to facilitate attachment to a desired structure.

Figure 8:
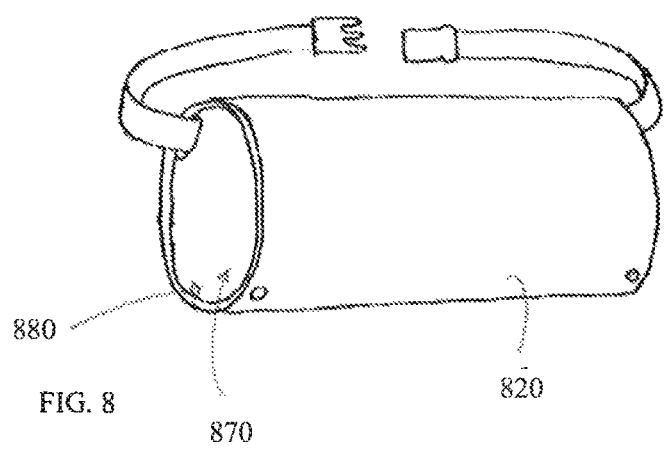
FIG. 8 is a diagram depicting an outer pillow according to an embodiment of the innovation.
Figure 9:
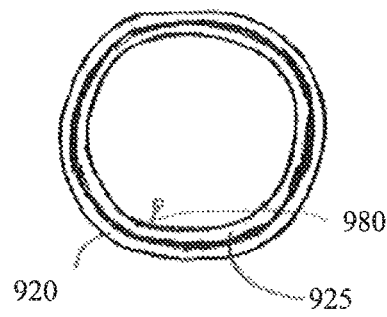
FIG. 9 is cross-section of an outer pillow including an inflatable material according to an embodiment of the innovation.

As depicted in FIG. 8, the pillow many include an outer pillow 820 having a cavity 870. The cavity is configured to accommodate an inner pillow (not shown in this figure). The outer pillow may include an inflatable material layer and an inflation means 880. FIG. 9 depicts a cross-section view of an embodiment having an inflation material layer 925 and an inflation means 980. It will be appreciated that the inflation material may comprise all of or a part of the outer pillow.

Figure 10:
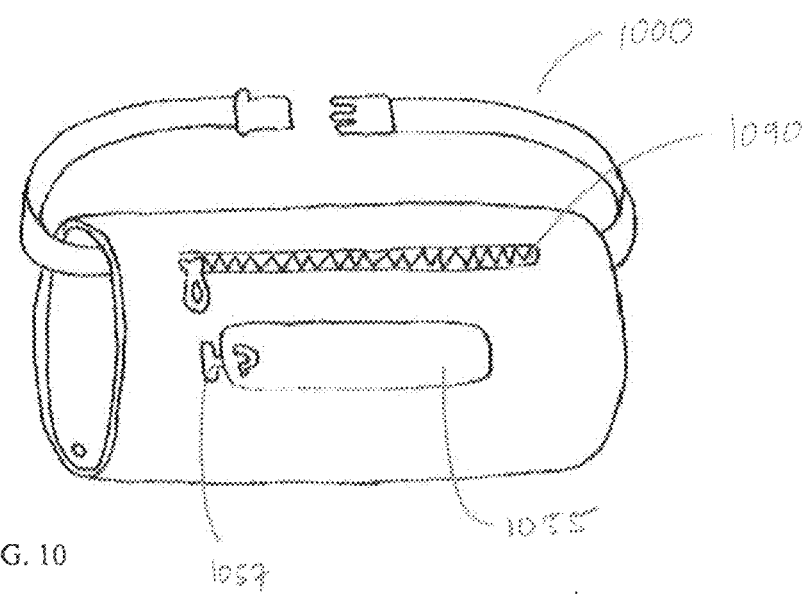
FIG. 10 is diagram depicting an outer pillow according to an embodiment of the innovation.

FIG. 10 depicts an embodiment of a pillow 1000 have a zippered compartment 1090. The zippered compartment may be be used to store personal items (e.g., ID cards, boarding passes, etc.) or to store attachment means (belts, straps, clips, etc.). In one embodiment, the anchoring system/storage container may be configured to be stored within the compartment. In one embodiment, the attached bag may be attached or attachable within the compartment. The bag may be removed from the compartment and then used to secure the pillow to a structure (e.g., a headrest). It is to be appreciated that the compartment can be most any type of compartment and need not include a zipper.

Figure 11A:
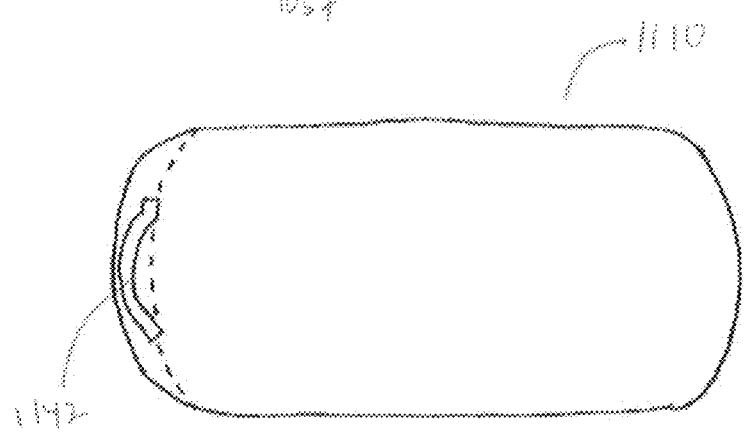
FIGS. 11A and 11B are diagrams of an inner pillow according to an embodiment of the innovation.
Figure 11B:
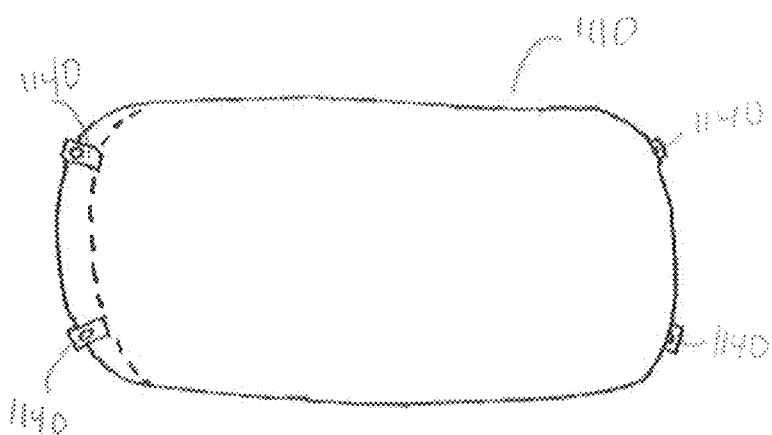

FIGS. 11A and 11B depict embodiments of an inner pillow 1110 having a handle/loop 1142 or tabs 1140 designed to accommodate attachment means or to attach to other structures. For example, the handle/loop 1142 may be used to attach the inner pillow to an outer pillow. The outer pillow may include a tab or loop securable by, for example a snap or a hook and loop material, around the loop 1142 of the inner pillow. The tabs 1140 may include snaps for attaching to a mating snap or may accommodate a clip for attaching to another structure (e.g., a window).

Figure 12A:
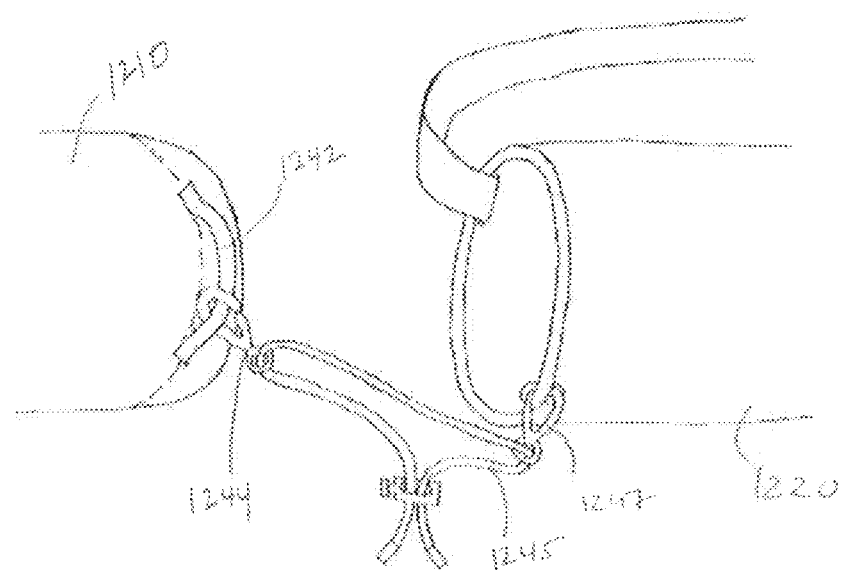
FIGS. 12A and 12B are diagrams of embodiments according to the innovation.
Figure 12B:
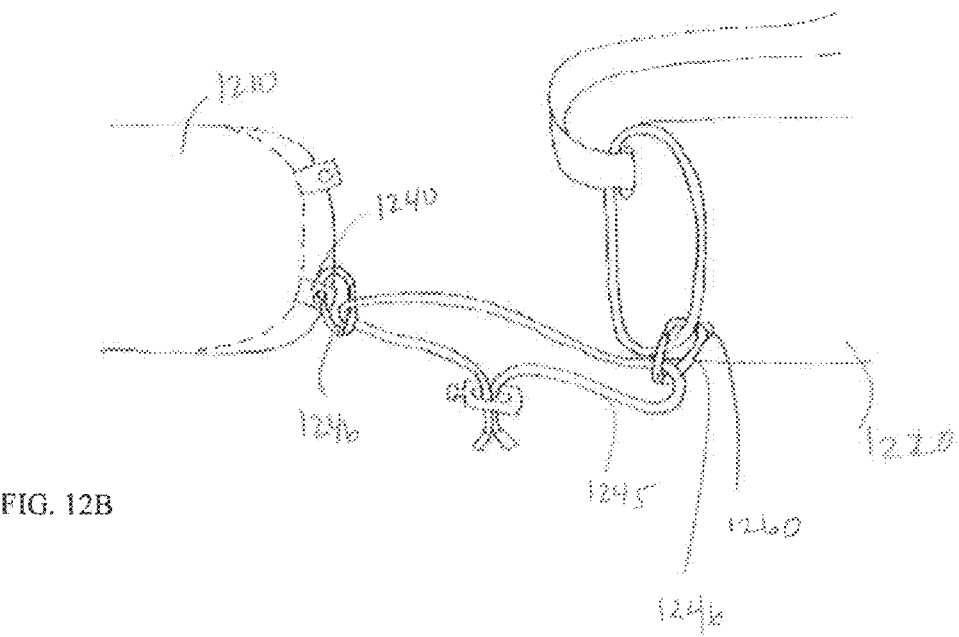

FIGS. 12A and 12B depict examples of how to attach the inner pillow 1210 to the outer pillow 1220. In one example depicted in FIG. 12A, the loop 1242 of the inner pillow 1210 may accommodate a clip 1244 attached to a cord string with a cord lock 1245. The opening 1260 of the outer pillow 1220 may accommodate a second clip 1244 that also attaches to the cord string with cord lock 1245. FIG. 12B depicts a similar configuration in which the inner pillow has tabs 1240 that accommodate a clip 1246.

Figure 13A:
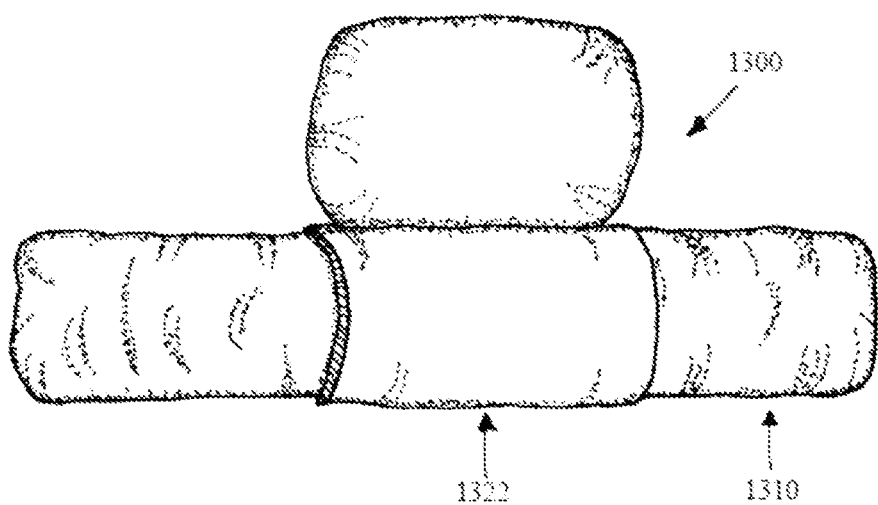
FIGS. 13A and 13B are photographs of an embodiment according to the innovation.
Figure 13B:
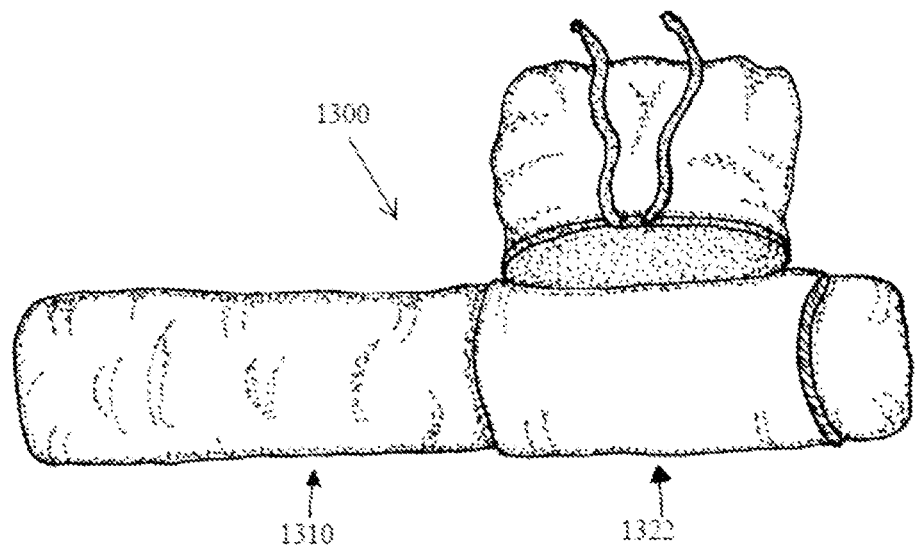

In one embodiment, the pillow 1300 may include an adjustable sleeve 1322 that can be moved along a length of the pillow body 1310. Moving the adjustable sleeve 1322 along the length of the pillow body 1310 allows for greater control over the shape of the pillow. In one embodiment, the adjustable sleeve 1322 may be an outer pillow. FIGS. 13A and B and FIG. 15 depict an embodiment in which the adjustable sleeve 1322 may be used to achieve a desired shape for the pillow 1300. The adjustable sleeve in FIG. 13B has been moved further along a length of the pillow body 1310 as compared to the adjustable sleeve in FIG. 13A. This movement along the length of the pillow body 1310 allows for greater control of the configuration of the pillow 1300.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A portable pillow comprising:
   a shapeable inner pillow comprising a resilient material capable of regaining an original shape; and
   an outer pillow portion comprising an inflatable material operatively connected to an inflation means, wherein the outer pillow portion further comprises:
      an adjustable sleeve having a sleeve cavity and two ends, wherein the sleeve cavity is configured to traverse along a length of the shapeable inner pillow thereby adjusting an amount of the inner pillow extending from either end of the adjustable sleeve, wherein the inner pillow is configured to fit at least partially within the sleeve cavity of the outer pillow portion and to be slidably positionable within the sleeve cavity;
      a first attachment means and a second attachment means, wherein the first attachment means fixedly attaches the adjustable sleeve to the shapeable inner pillow via a storage cavity, and the second attachment means comprises a bag, wherein the bag facilitates removable attachment of the portable pillow over a structure;
      wherein during a first configuration of the portable pillow, the second attachment means is configured to be secured over a vehicle seat, and
      wherein during a second configuration of the portable pillow, the second attachment means is removed from the vehicle seat and the portable pillow is configured to be stored inside the bag.

2. The portable pillow of claim 1, wherein the inner pillow is fixedly attached to the outer pillow portion.

3. The portable pillow of claim 1, wherein the inner pillow is removably attached to the outer pillow portion.

4. The portable pillow of claim 1, wherein the inner pillow further comprises a handle.

5. The portable pillow of claim 1, wherein the first attachment means is selected from a group consisting of: a clip, a snap, a loop, a handle, a drawstring, a button, and a hook and loop fastener.

6. The portable pillow of claim 1 wherein the outer pillow portion and the inner pillow each include an outer layer, wherein the outer layer of both the outer pillow portion and the inner pillow comprise the same material.

7. The portable pillow of claim 1, wherein the outer pillow portion further includes a zippered compartment for securing items.

8. A portable pillow system comprising:
an inflatable shell comprising a cavity;
a shapeable inner pillow configured to fit at least partially within the cavity of the inflatable shell;
an inflation means operatively connected to the inflatable, the inflatable shell having a first outer layer and the shapeable inner pillow having a second outer layer;
an adjustable sleeve having a sleeve cavity and two ends configured to traverse along a length of the shapeable inner pillow thereby adjusting an amount of shapeable inner pillow on extending from either end of the adjustable sleeve; and
a first attachment means and a second attachment means, the first attachment means configured to attach the adjustable sleeve to the shapeable inner pillow, and the second attachment means is configured to secure the inflatable shell to a desired structure, wherein the second attachment means comprises a storage cavity that facilitates removeable attachment to the desired structure, and
wherein the storage cavity is configured to store the shapeable inner pillow together to the first attachment means;
wherein the second attachment means comprises:
a first configuration such that the second attachment means is configured to be secured over a vehicle seat; and
a second configuration such that the second attachment means is not in use and the pillow system is removed from the vehicle seat.

9. The portable pillow system of claim 8, wherein the first outer layer of the inflatable shell and the second outer layer of the shapeable inner pillow comprises the same material.

10. The portable pillow system of claim 9, wherein the material is a plush material.

11. The portable pillow system of claim 8, wherein the first attachment means is selected from a group consisting of: a clip, a snap, a loop, a handle, a drawstring, a button, and a hook and loop fastener.

12. The portable pillow system of claim 8, wherein the inflatable shell further includes a zippered compartment for securing items.

13. The portable pillow system of claim 9, wherein the material includes spandex.

\* \* \* \* \*